US011267572B2

(12) United States Patent
Vandyke

(10) Patent No.: US 11,267,572 B2
(45) Date of Patent: Mar. 8, 2022

(54) AIRCRAFT AIR DISTRIBUTION ASSEMBLY

(71) Applicant: The Boeing Company, Chicago, IL (US)

(72) Inventor: Bryce Avery Vandyke, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 419 days.

(21) Appl. No.: 16/183,982

(22) Filed: Nov. 8, 2018

(65) Prior Publication Data

US 2020/0148367 A1    May 14, 2020

(51) Int. Cl.
- *B64D 13/04*    (2006.01)
- *B64D 13/06*    (2006.01)
- *B64D 13/00*    (2006.01)

(52) U.S. Cl.
CPC ............. *B64D 13/04* (2013.01); *B64D 13/06* (2013.01); *B64D 2013/003* (2013.01); *B64D 2013/0625* (2013.01)

(58) Field of Classification Search
CPC .. B64D 13/04; B64D 13/06; B64D 2013/003; B64D 2013/065

USPC ........................................................ 454/76
See application file for complete search history.

(56) References Cited

U.S. PATENT DOCUMENTS

| 3,330,506 | A | * | 7/1967 | Robillard | ............... | B64D 11/00 |
| | | | | | | 244/118.5 |
| 4,432,514 | A | * | 2/1984 | Brandon | ................... | B64C 1/18 |
| | | | | | | 137/513.3 |
| 4,819,548 | A | * | 4/1989 | Horstman | .............. | B64D 13/00 |
| | | | | | | 244/118.5 |
| 4,896,588 | A | * | 1/1990 | Monda | ................... | B64D 13/00 |
| | | | | | | 181/225 |
| 2008/0112155 | A1 | | 5/2008 | Scown et al. | | |
| 2015/0063995 | A1 | * | 3/2015 | Rivera | ................... | B64D 13/06 |
| | | | | | | 415/207 |

* cited by examiner

*Primary Examiner* — Avinash A Savani
*Assistant Examiner* — Dana K Tighe
(74) *Attorney, Agent, or Firm* — Yee & Associates, P.C.

(57) ABSTRACT

An aircraft air distribution assembly providing integrated personally controllable air flow and cabin air flow is presented. The aircraft air distribution assembly comprises a plenum and a flow restriction system. The plenum is connected to a plurality of personal air outlets configured to provide the personally controllable air flow. The flow restriction system extends through at least one wall of the plenum, the flow restriction system configured to set a pressure for the cabin air flow.

18 Claims, 13 Drawing Sheets

AIRCRAFT AIR DISTRIBUTION ASSEMBLY

BACKGROUND INFORMATION

1. Field

The present disclosure relates generally to aircraft and, more specifically, to directing air within a cabin of an aircraft.

2. Background

The environmental control system (ECS) on an aircraft provides air supply within a passenger cabin of the aircraft. Currently, air is provided into the passenger cabin using two types of components: personal air outlets and air nozzles. Personal air outlets (PAOs), also known as gaspers, are individually adjustable by passengers. The air nozzles are also provided along the length of an aircraft and are not adjustable by the passengers. The air nozzles are often positioned above or beneath luggage bins.

The air supplied to personal air outlets by the environmental control system is at a higher pressure than the air supplied to the air nozzles. Separate tubing provides air at the two different pressures to the personal air outlets and the air nozzles.

It would be desirable to have a method and apparatus that take into account at least some of the issues discussed above, as well as other possible issues. For example, it would be desirable to reduce the tubing used to supply air to personal air outlets and air nozzles of an aircraft.

SUMMARY

An illustrative embodiment of the present disclosure provides an aircraft air distribution assembly providing integrated personally controllable air flow and cabin air flow. The aircraft air distribution assembly comprises a plenum and a flow restriction system. The plenum is connected to a plurality of personal air outlets configured to provide the personally controllable air flow. The flow restriction system extends through at least one wall of the plenum, the flow restriction system configured to set a pressure for the cabin air flow.

Another illustrative embodiment of the present disclosure provides an aircraft. The aircraft comprises a row of passenger seats within a cabin of the aircraft, and an aircraft air distribution assembly positioned above the row of passenger seats. The aircraft air distribution assembly comprises a plenum connected to a plurality of personal air outlets and a flow restriction system extending through at least one wall of the plenum.

A further illustrative embodiment of the present disclosure provides a method of distributing air using an aircraft air distribution assembly. Air having a first pressure is supplied to a plenum of the aircraft air distribution assembly. A portion of the air is directed from the plenum through a set of personal air outlets. A remainder of the air is sent through a flow restriction system and into a cabin of the aircraft at a second pressure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that reducing weight of an aircraft is desirable. Reducing the weight of the aircraft increases fuel efficiency. Reducing the weight of the aircraft allows for greater amounts of paid cargo or paid passengers on the aircraft.

The illustrative embodiments recognize and take into account that passenger cabin air distribution nozzles are currently separate, dedicated air nozzles which are located along the length of airplane and are installed independent of a quantity of passengers. Air nozzles are currently installed independent of seating arrangements of the aircraft. The air nozzles are designed and installed for the maximum number of passengers in an aircraft and are not reduced in quantity for lower passenger count designs.

Regulatory agencies, such as the FAA, provide regulations for a minimum amount of fresh air per passenger. A quantity of passengers is variable depending upon the layout of seats within the passenger cabin. With current air nozzle designs, an amount of air (a combination of fresh and recirculated air) is provided that is related to the highest possible quantity of seats on the aircraft. The illustrative embodiments recognize and take into account that by installing a quantity of air nozzles related to the actually-installed quantity of passenger seats, an amount of air would be provided that is related to the installed quantity of seats on the aircraft.

The illustrative embodiments recognize and take into account that reducing the quantity of air nozzles can reduce fuel burn, because the air nozzles are only distributing the air needed. The illustrative embodiments recognize and take into account that reducing the quantity of air outlets would reduce the weight of an aircraft. The illustrative embodiments recognize and take into account that reducing the quantity of air outlets would also provide a cost benefit.

The illustrative embodiments recognize and take into account that reducing tubing for air supply by the environmental control system would be desirable. Further, the illustrative embodiments recognize and take into account that dedicated separate air distribution nozzles are undesirably costly, take up an undesirable amount of room in the passenger cabin, and add extra weight and cost.

The illustrative embodiments provide an aircraft air distribution assembly providing integrated personally controllable air flow and cabin air flow. By providing integrated personally controllable air flow and cabin air flow, the aircraft air distribution assembly reduces at least one of a weight of the aircraft, an amount of tubing in the aircraft, a manufacturing cost of the aircraft, or an operating cost of the aircraft.

Figure 1:
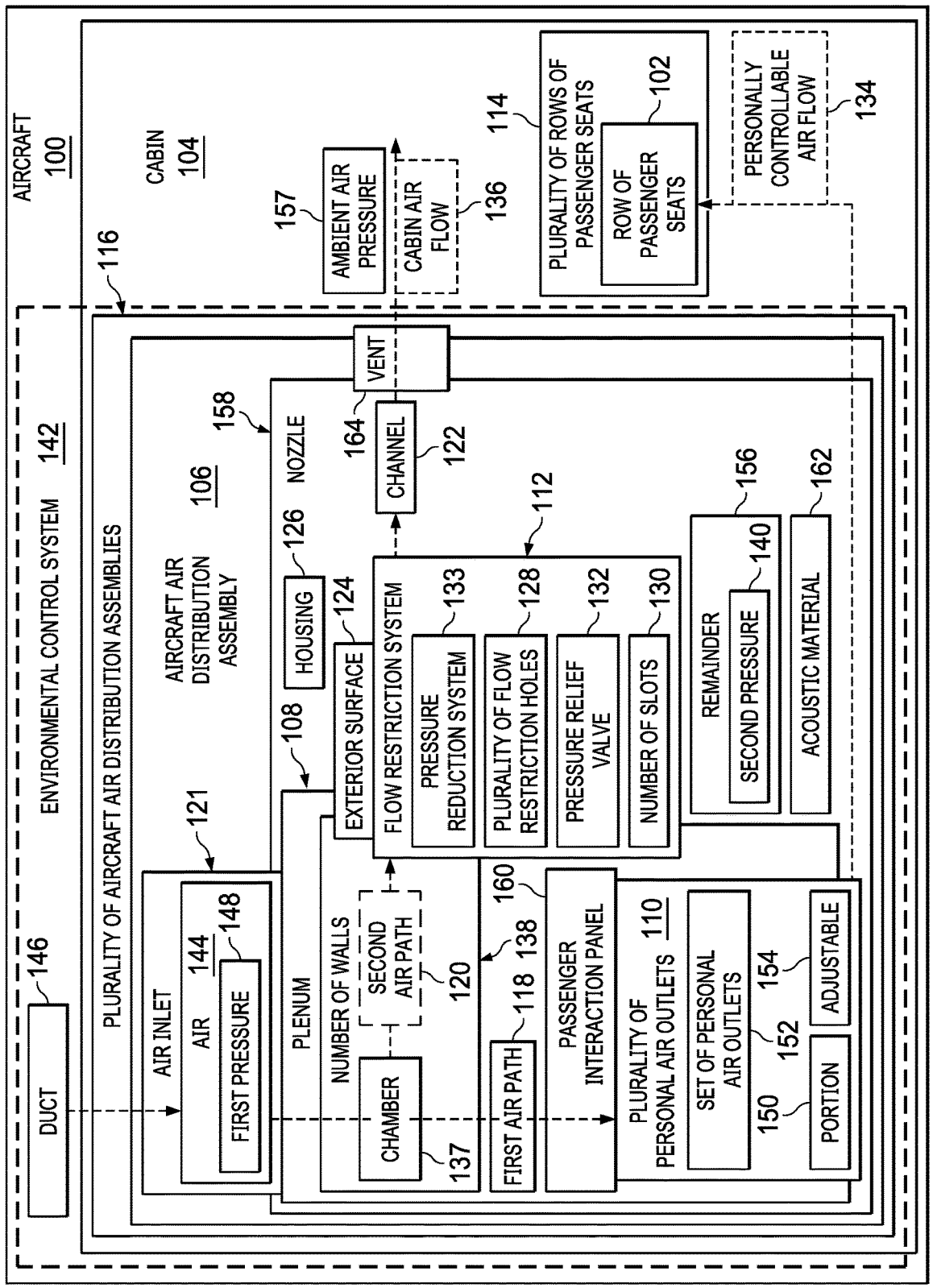
FIG. 1 is an illustration of a block diagram of an aircraft in which an aircraft air distribution assembly operates in accordance with an illustrative embodiment.

Turning now to FIG. 1, an illustration of a block diagram of an aircraft in which an aircraft air distribution assembly operates is depicted in accordance with an illustrative embodiment. Aircraft 100 comprises row of passenger seats 102 within cabin 104 of aircraft 100 and aircraft air distribution assembly 106 positioned above row of passenger seats 102. Aircraft air distribution assembly 106 comprises plenum 108 connected to plurality of personal air outlets 110 and flow restriction system 112 extending through at least one wall of plenum 108. Aircraft air distribution assembly 106 provides integrated personally controllable air flow and cabin air flow.

Row of passenger seats 102 is one of plurality of rows of passenger seats 114. As depicted, aircraft air distribution assembly 106 is one of plurality of aircraft air distribution assemblies 116. Each aircraft air distribution assembly of plurality of aircraft air distribution assemblies 116 provides integrated personally controllable air flow and cabin air flow. Each aircraft air distribution assembly is positioned above a respective row of passenger seats of plurality of rows of passenger seats 114.

By providing plurality of aircraft air distribution assemblies 116, at least one of weight of aircraft 100, cost of aircraft 100, or fuel burn of aircraft 100 during operation is reduced. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The quantity of aircraft air distribution assemblies in plurality of aircraft air distribution assemblies 116 is the same as a quantity of rows of passenger seats in plurality of rows of passenger seats 114. By providing plurality of aircraft air distribution assemblies 116, cabin air flow is provided based on the quantity of passenger seats within aircraft 100. By providing plurality of aircraft air distribution assemblies 116, an amount of cabin air flow is provided that is related to a quantity of passengers in aircraft 100.

Aircraft air distribution assembly 106 has first air path 118 extending from air inlet 121 into plenum 108 and through plurality of personal air outlets 110 connected to plenum 108, and second air path 120 from air inlet 121 into plenum 108, through flow restriction system 112, and through channel 122 formed by exterior surface 124 of plenum 108 and housing 126 of aircraft air distribution assembly 106. As depicted, flow restriction system 112 comprises at least one flow restrictor. As depicted, flow restriction system 112 comprises at least one of plurality of flow restriction holes 128, number of slots 130, or pressure relief valve 132. Flow restriction system 112 serves as pressure reduction system 133.

Aircraft air distribution assembly 106 provides integrated personally controllable air flow 134 and cabin air flow 136. Aircraft air distribution assembly 106 comprises plenum 108 connected to plurality of personal air outlets 110 configured to provide personally controllable air flow 134, and flow restriction system 112 extending through at least one wall of plenum 108. Flow restriction system 112 is configured to set a pressure for cabin air flow 136.

Plenum 108 forms chamber 137. Air 144 enters chamber 137 at air inlet 121. Air 144 exits chamber 137 via plurality of personal air outlets 110 and flow restriction system 112.

Flow restriction system 112 extends through at least one wall of number of walls 138 of plenum 108. In some illustrative examples, flow restriction system 112 extends through each of number of walls 138. In some other illustrative examples, flow restriction system 112 extends through only two walls of number of walls 138. In other illustrative examples, flow restriction system 112 extends through only one wall of number of walls 138.

In some illustrative examples, flow restriction system 112 comprises plurality of flow restriction holes 128. Plurality of flow restriction holes 128 have any desirable size and any desirable shape. Plurality of flow restriction holes are configured to provide cabin air flow 136 with second pressure 140. In some illustrative examples, plurality of flow restriction holes 128 is circular. Plurality of flow restriction holes 128 is present in any desirable quantity of walls of number of walls 138.

In some illustrative examples, flow restriction system 112 comprises pressure relief valve 132. In some examples, pressure relief valve 132 is remotely controllable, when present.

Environmental control system 142 of aircraft 100 provides air 144 to air inlet 121 using duct 146. Duct 146 supplies air 144 to aircraft air distribution assembly 106 to be used for both personally controllable air flow 134 and cabin air flow 136. Air 144 supplied to air inlet 121 has first pressure 148.

Air 144 having first pressure 148 is supplied to plenum 108 of aircraft air distribution assembly 106 from air inlet 121. Portion 150 of air 144 from plenum 108 is directed through set of personal air outlets 152 of plurality of personal air outlets 110.

Each personal air outlet of plurality of personal air outlets 110 is adjustable 154. By being adjustable 154, each personal air outlet of plurality of personal air outlets 110 may be open, partially open, or closed. Set of personal air outlets 152 is any quantity of plurality of personal air outlets 110 that is partially open or open. Set of personal air outlets 152 includes any desirable quantity of personal air outlets, including zero.

In some illustrative examples, all personal air outlets in plurality of personal air outlets 110 are in set of personal air outlets 152 providing personally controllable air flow 134. In other illustrative examples, none of personal air outlets in plurality of personal air outlets 110 are open or partially open and personally controllable air flow 134 is not present. In these illustrative examples, set of personal air outlets 152 has zero personal air outlets because none of personal air outlets in plurality of personal air outlets 110 are open or partially open. In yet other illustrative examples, one or two or more of personal air outlets in plurality of personal air outlets 110 are open or partially open and personally controllable air flow 134 flows through the one or two or more open or partially open personal air outlets.

Portion 150 of air 144 is directed through set of personal air outlets 152. Remainder 156 of air 144 is sent through flow restriction system 112 and into cabin 104 of aircraft 100 at second pressure 140. Second pressure 140 is between first pressure 148 and ambient air pressure 157 within cabin 104.

Remainder 156 of air 144 exits aircraft air distribution assembly 106 from channel 122. Channel 122 is formed between exterior surface 124 of plenum 108 and housing 126 of aircraft air distribution assembly 106. Channel 122 directs remainder 156 of air 144 into cabin 104.

Housing 126 of aircraft air distribution assembly 106 forms nozzle 158 configured to direct air 144 from channel 122 into cabin 104 to provide cabin air flow 136. Nozzle 158 takes any desirable shape to direct air 144 within cabin 104. In some illustrative examples, nozzle 158 encircles passenger interaction panel 160 of aircraft air distribution assembly 106. Plurality of personal air outlets 110 extends through passenger interaction panel 160.

In some illustrative examples, channel 122 surrounds passenger interaction panel 160. In these illustrative examples, cabin air flow 136 exits channel 122 around passenger interaction panel 160. In other illustrative examples, cabin air flow 136 exits channel 122 around only a portion of passenger interaction panel 160.

In some illustrative examples, channel 122 does not surround the entirety of passenger interaction panel 160. In some non-depicted illustrative examples, channel 122 is formed using a portion of housing 126 and a portion of an exterior surface of plenum 108. In some non-depicted illustrative examples, multiple channels are formed by housing 126 and exterior surface 124 of plenum 108.

Housing 126 is joined to plenum 108 in any desirable fashion. In some illustrative examples, housing 126 is at least one of fastened to plenum 108, welded to plenum 108, snapped onto plenum 108, or bonded to plenum 108. In some illustrative examples, housing 126 is formed and integrated along with plenum 108 by additive manufacturing. When housing 126 and plenum 108 are formed together through additive manufacturing, fastening, welding, snapping, or bonding is not used. Housing 126 surrounds exterior surface 124 of plenum 108.

In some illustrative examples, acoustic material 162 is present in channel 122. In some illustrative examples, acoustic material 162 is connected to housing 126 within channel 122. When present, acoustic material 162 is configured to reduce the noise in aircraft air distribution assembly 106. When present, acoustic material 162 is configured to dampen or deaden noise within channel 122 of aircraft air distribution assembly 106. Acoustic material 162 takes the form of any desirable type of sound dampening or sound deadening material. Acoustic material 162 may be chosen based on at least one of weight, flammability, noise dampening, or other material characteristics. The presence of acoustic material 162 in aircraft air distribution assembly 106 is optional. The illustration of aircraft 100 and aircraft air distribution assembly 106 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, the opening of channel 122 may be referred to as vent 164. Cabin air flow 136 exits channel 122 at vent 164. In some illustrative examples, acoustic material 162 is an acoustic treatment applied to housing 126. In some illustrative examples, an acoustic material or acoustic treatment is present in plenum 108.

Figure 2:
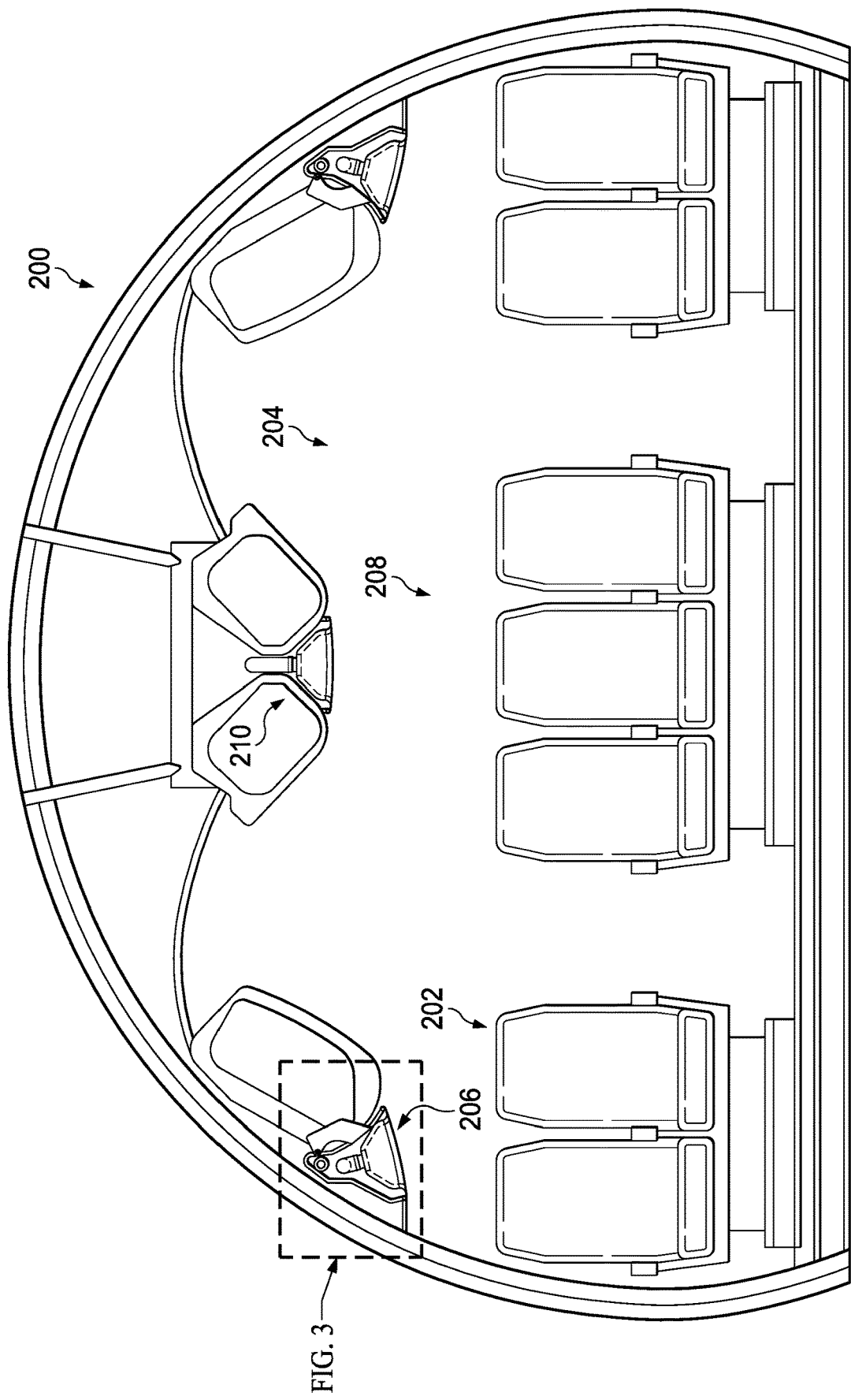
FIG. 2 is an illustration of a cross-sectional view of an aircraft in which an aircraft air distribution assembly operates in accordance with an illustrative embodiment.

Turning now to FIG. 2, an illustration of a cross-sectional view of an aircraft in which an aircraft air distribution assembly operates is depicted in accordance with an illustrative embodiment. Aircraft 200 is a physical implementation of aircraft 100 of FIG. 1.

Aircraft 200 comprises row of passenger seats 202 within cabin 204 of aircraft 200, and aircraft air distribution assembly 206 positioned above row of passenger seats 202.

Row of passenger seats 202 is one of plurality of rows of passenger seats 208. Aircraft air distribution assembly 206 is one of plurality of aircraft air distribution assemblies 210. Each aircraft air distribution assembly of plurality of aircraft air distribution assemblies 210 provides integrated personally controllable air flow and cabin air flow. Each aircraft air distribution assembly is positioned above a respective row of passenger seats of plurality of rows of passenger seats 208.

By having plurality of aircraft air distribution assemblies 210 associated with plurality of rows of passenger seats 208, the quantity of air distribution assemblies in plurality of aircraft air distribution assemblies 210 is associated with a seating capacity of aircraft 200. The quantity of air distribution assemblies in plurality of aircraft air distribution assemblies 210 is associated with a quantity of rows of passenger seats in plurality of rows of passenger seats 208.

Plurality of aircraft air distribution assemblies 210 can be used to supply an amount of air to cabin 204 directly tied to a quantity of passengers in aircraft 200. Plurality of aircraft air distribution assemblies 210 reduce at least one of a weight of aircraft 200, a manufacturing cost of aircraft 200, an operating cost of aircraft 200, or a fuel burn of aircraft 200 during operation.

Figure 3:
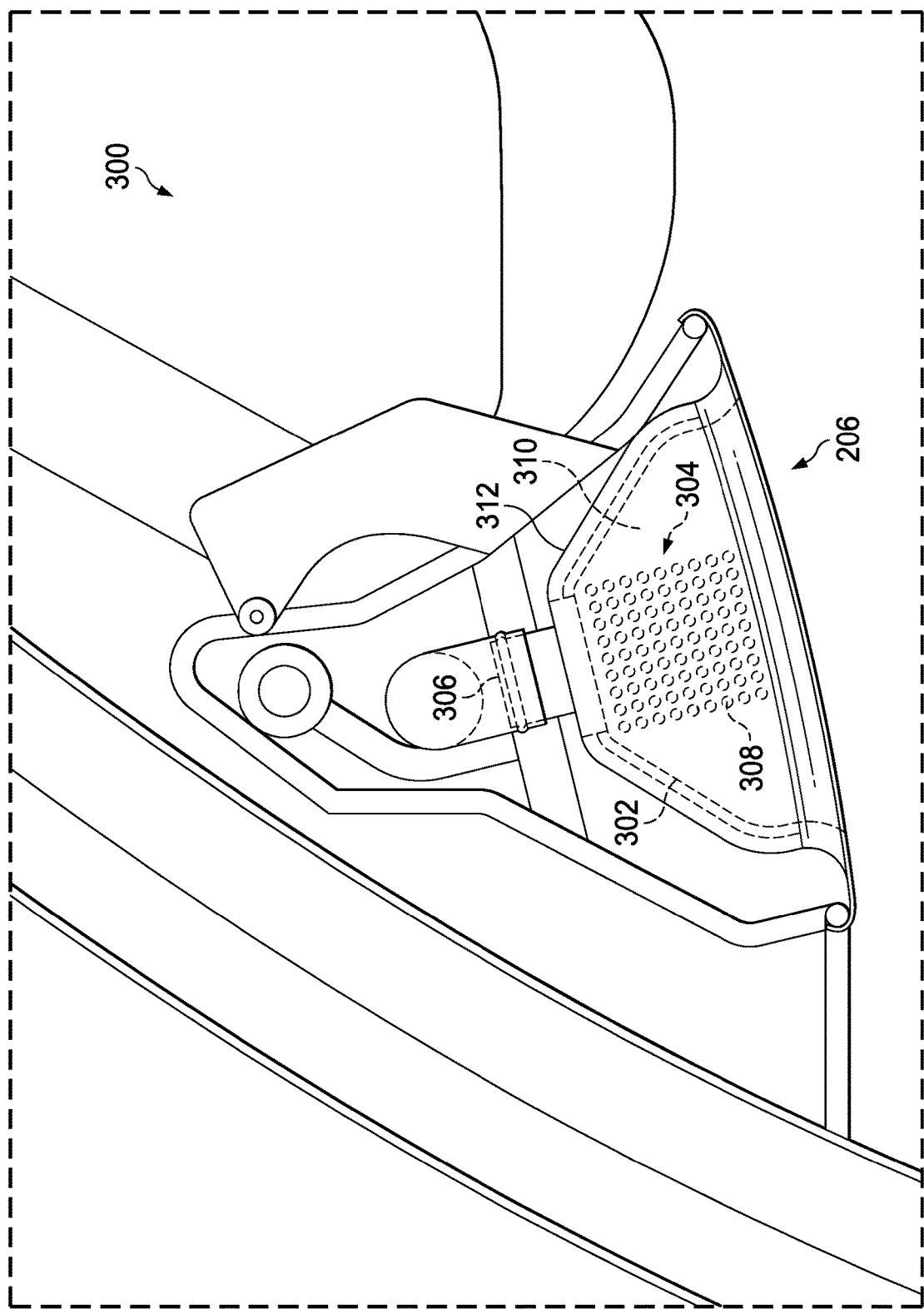
FIG. 3 is an illustration of a cross-sectional view of a portion of an aircraft with an aircraft air distribution assembly in accordance with an illustrative embodiment.

Turning now to FIG. 3, an illustration of a cross-sectional view of a portion of an aircraft with an aircraft air distribution assembly is depicted in accordance with an illustrative embodiment. View 300 is a view within box 3 of FIG. 2.

In view 300, aircraft air distribution assembly 206 comprises a plenum 302 connected to a plurality of personal air outlets (not depicted) and flow restriction system 304 extending through at least one wall of plenum 302.

Aircraft air distribution assembly 206 provides integrated personally controllable air flow and cabin air flow. Aircraft air distribution assembly 206 has a first air path extending from air inlet 306 into plenum 302 and through a plurality of personal air outlets connected to plenum 302. The first air path provides the personally controllable air flow.

Aircraft air distribution assembly 206 has a second air path extending from air inlet 306 into plenum 302, through flow restriction system 304, and through a channel formed by an exterior surface of plenum 302 and housing 312 of aircraft air distribution assembly 206. The second air path provides the cabin air flow.

Flow restriction system 304 comprises at least one of a plurality of flow restriction holes, a number of slots, or a pressure relief valve. As depicted, flow restriction system 304 comprises plurality of flow restriction holes 308 extending through wall 310 of plenum 302.

Flow restriction system 304 serves as a pressure reduction system. The cabin air flow has a lower pressure than the personally controllable air flow due to flow restriction system 304.

Figure 4:
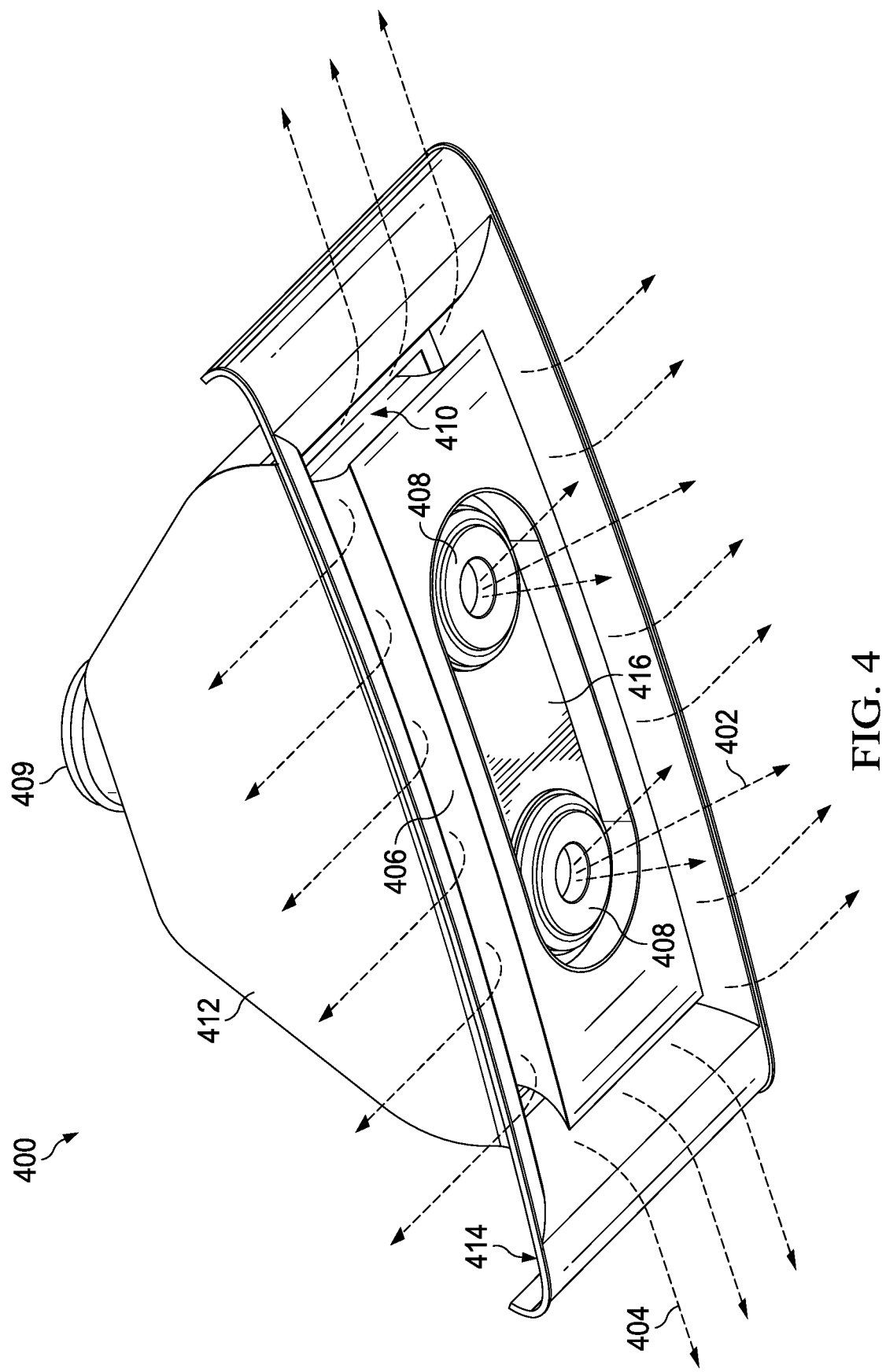
FIG. 4 is an illustration of a perspective bottom view of an aircraft air distribution assembly in accordance with an illustrative embodiment.

Turning now to FIG. 4, an illustration of a perspective bottom view of an aircraft air distribution assembly is depicted in accordance with an illustrative embodiment. Aircraft air distribution assembly 400 is a physical implementation of aircraft air distribution assembly 106 of FIG. 1. Aircraft air distribution assembly 400 may be installed within aircraft 200 of FIG. 2. In some illustrative examples, aircraft air distribution assembly 400 is a physical implementation of aircraft air distribution assembly 206 of FIGS. 2 and 3.

Aircraft air distribution assembly 400 provides integrated personally controllable air flow 402 and cabin air flow 404. Aircraft air distribution assembly 400 comprises plenum 406 connected to plurality of personal air outlets 408 configured to provide personally controllable air flow 402. A flow restriction system extends through at least one wall of plenum 406 and is configured to set a pressure for cabin air flow 404.

Personally controllable air flow 402 has a higher pressure than cabin air flow 404. The flow restriction system of aircraft air distribution assembly 400 reduces the pressure of air within aircraft air distribution assembly 400 from a pressure provided at air inlet 409.

Air is supplied to aircraft air distribution assembly 400 at air inlet 409. Air supplied to air inlet 409 is separated to provide both personally controllable air flow 402 and cabin air flow 404. By integrating personally controllable air flow 402 and cabin air flow 404, the quantity of hoses to provide air to a cabin of an aircraft is reduced.

Aircraft air distribution assembly 400 has channel 410. Channel 410 is formed between an exterior surface of plenum 406 and housing 412 of aircraft air distribution assembly 400. Cabin air flow 404 exits channel 410 to enter a cabin of an aircraft.

Housing 412 is joined to plenum 406 using any desirable method. In some illustrative examples, housing 412 is at least one of fastened to plenum 406, welded to plenum 406, snapped onto plenum 406, or bonded to plenum 406. In some illustrative examples, housing 412 is formed and integrated along with plenum 406 by additive manufacturing. When housing 412 and plenum 406 are formed together through additive manufacturing, fastening, welding, snapping, or bonding is not used.

Housing 412 forms nozzle 414 configured to direct air from channel 410 into the cabin to provide cabin air flow 404. As depicted, nozzle 414 encircles passenger interaction panel 416 of aircraft air distribution assembly 400. Plurality of personal air outlets 408 extends through passenger interaction panel 416. As depicted, housing 412 surrounds an exterior surface of plenum 406.

The illustration of aircraft air distribution assembly 400 in FIG. 4 is not meant to imply physical or architectural limitations to the manner in which an illustrative embodiment may be implemented. Other components in addition to or in place of the ones illustrated may be used. Some components may be unnecessary.

As depicted, channel 410 surrounds passenger interaction panel 416. In some illustrative examples, cabin air flow 404 exits channel 410 around passenger interaction panel 416. In other illustrative examples, cabin air flow 404 exits channel 410 around only a portion of passenger interaction panel 416.

In some non-depicted illustrative examples, channel 410 does not surround the entirety of passenger interaction panel 416. In some non-depicted illustrative examples, channel 410 is formed using a portion of housing 412 and a portion of an exterior surface of plenum 406. In some non-depicted illustrative examples, multiple channels are formed by housing 412 and the exterior surface of plenum 406.

Figure 5:
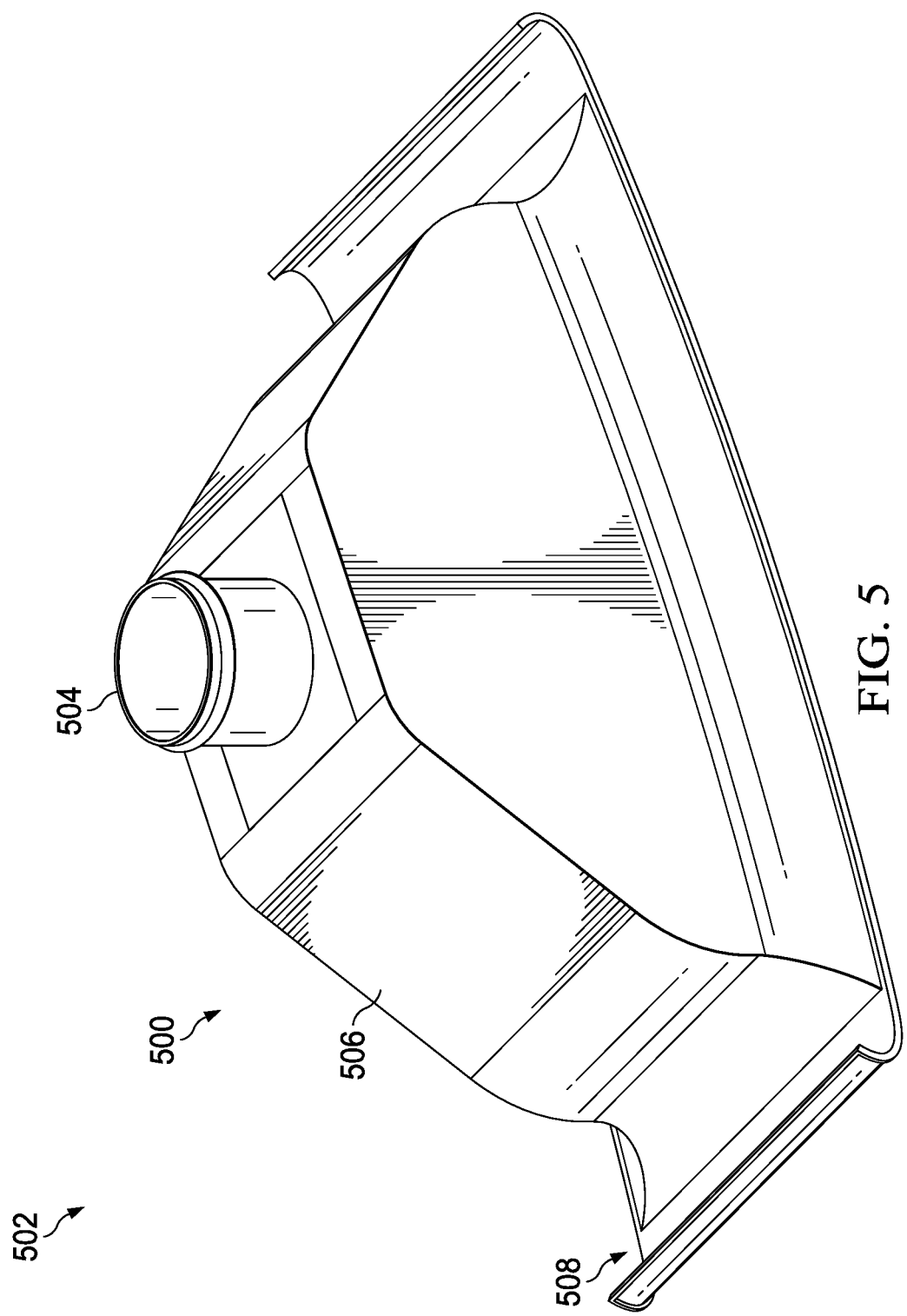
FIG. 5 is an illustration of a perspective top view of an aircraft air distribution assembly in accordance with an illustrative embodiment.

Turning now to FIG. 5, an illustration of a perspective top view of an aircraft air distribution assembly is depicted in accordance with an illustrative embodiment. Aircraft air distribution assembly 500 is a physical implementation of aircraft air distribution assembly 106 of FIG. 1. Aircraft air distribution assembly 500 may be installed within aircraft 200 of FIG. 2. In some illustrative examples, aircraft air distribution assembly 500 is a physical implementation of aircraft air distribution assembly 206 of FIGS. 2 and 3. In some illustrative examples, view 502 of aircraft air distribution assembly 500 is a back perspective view of aircraft air distribution assembly 400 of FIG. 4.

In view 502, air inlet 504 and housing 506 of aircraft air distribution assembly 500. Air inlet 504 receives air from a duct of an environmental control system. Air provided to air inlet 504 is used to provide personally controllable air flow and cabin air flow.

A flow restriction system of aircraft air distribution assembly 500 is configured to set a pressure for the cabin air flow. The personally controllable air flow has a higher pressure than cabin air flow. The flow restriction system of aircraft air distribution assembly 500 reduces the pressure of air entering aircraft air distribution assembly 500 at air inlet 504. Housing 506 forms nozzle 508 configured to direct air from a channel of aircraft air distribution assembly 500 into a cabin of an aircraft to provide cabin air flow.

Figure 6:
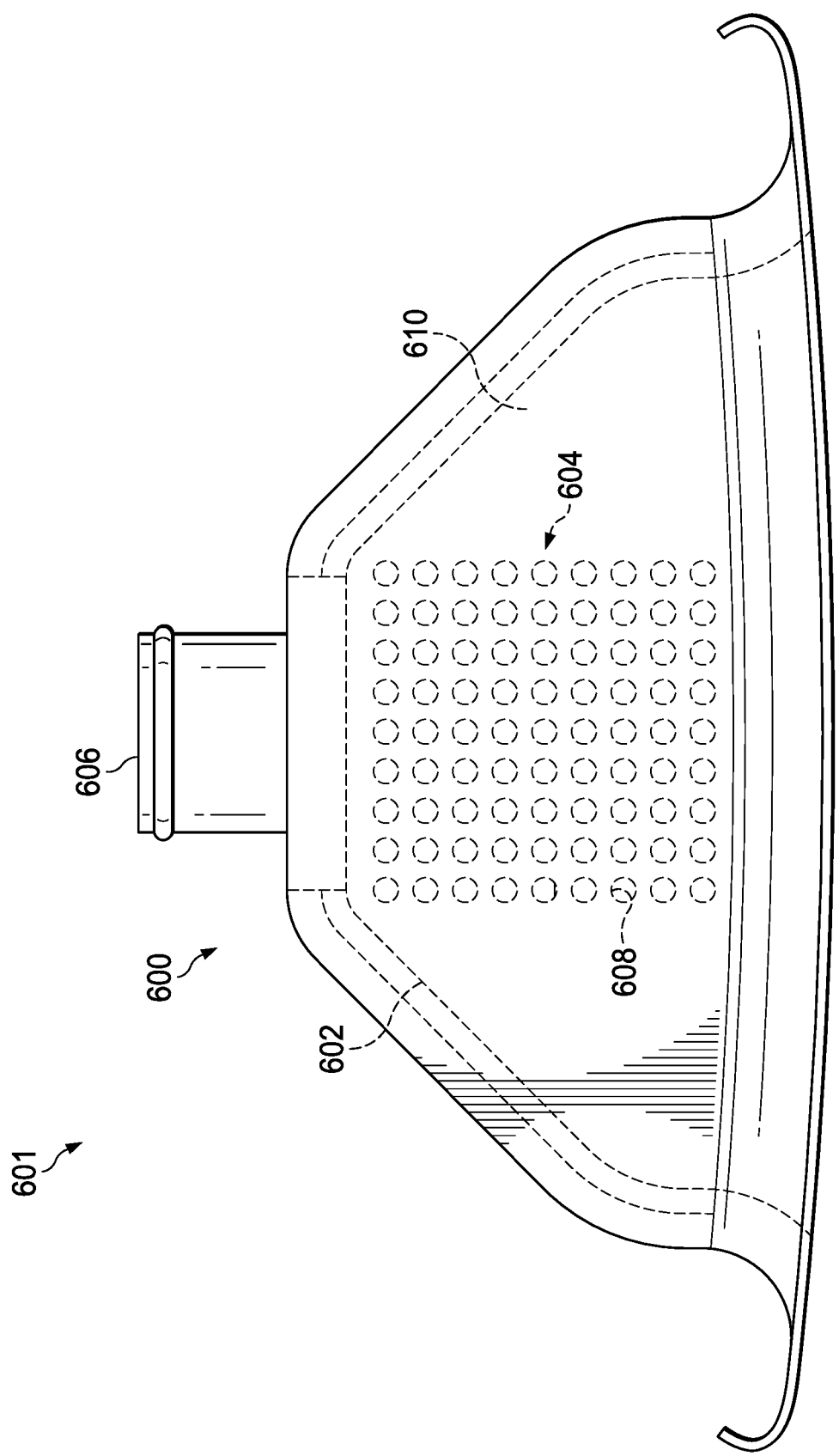
FIG. 6 is an illustration of a side view of an aircraft air distribution assembly in accordance with an illustrative embodiment.

Turning now to FIG. 6, an illustration of a side view of an aircraft air distribution assembly is depicted in accordance with an illustrative embodiment. Aircraft air distribution assembly 600 is a physical implementation of aircraft air distribution assembly 106 of FIG. 1. Aircraft air distribution assembly 600 may be installed within aircraft 200 of FIG. 2. In some illustrative examples, aircraft air distribution assembly 600 is a physical implementation of aircraft air distribution assembly 206 of FIGS. 2 and 3. In some illustrative examples, view 601 of aircraft air distribution assembly 600 is a side view of at least one of aircraft air distribution assembly 400 of FIG. 4 or aircraft air distribution assembly 500 of FIG. 5.

Aircraft air distribution assembly 600 comprises plenum 602 connected to a plurality of personal air outlets (not depicted) and flow restriction system 604 extending through at least one wall of plenum 602.

Aircraft air distribution assembly 600 provides integrated personally controllable air flow and cabin air flow. Aircraft air distribution assembly 600 has a first air path extending from air inlet 606 into plenum 602 and through a plurality of personal air outlets connected to plenum 602. The first air path provides the personally controllable air flow.

Aircraft air distribution assembly 600 has a second air path extending from air inlet 606 into plenum 602, through flow restriction system 604, and through a channel formed by an exterior surface of plenum 602 and a housing of aircraft air distribution assembly 600. The second air path provides the cabin air flow.

Flow restriction system 604 comprises at least one of a plurality of flow restriction holes, a number of slots, or a pressure relief valve. As depicted, flow restriction system 604 comprises plurality of flow restriction holes 608 extending through wall 610 of plenum 602.

Figure 7:
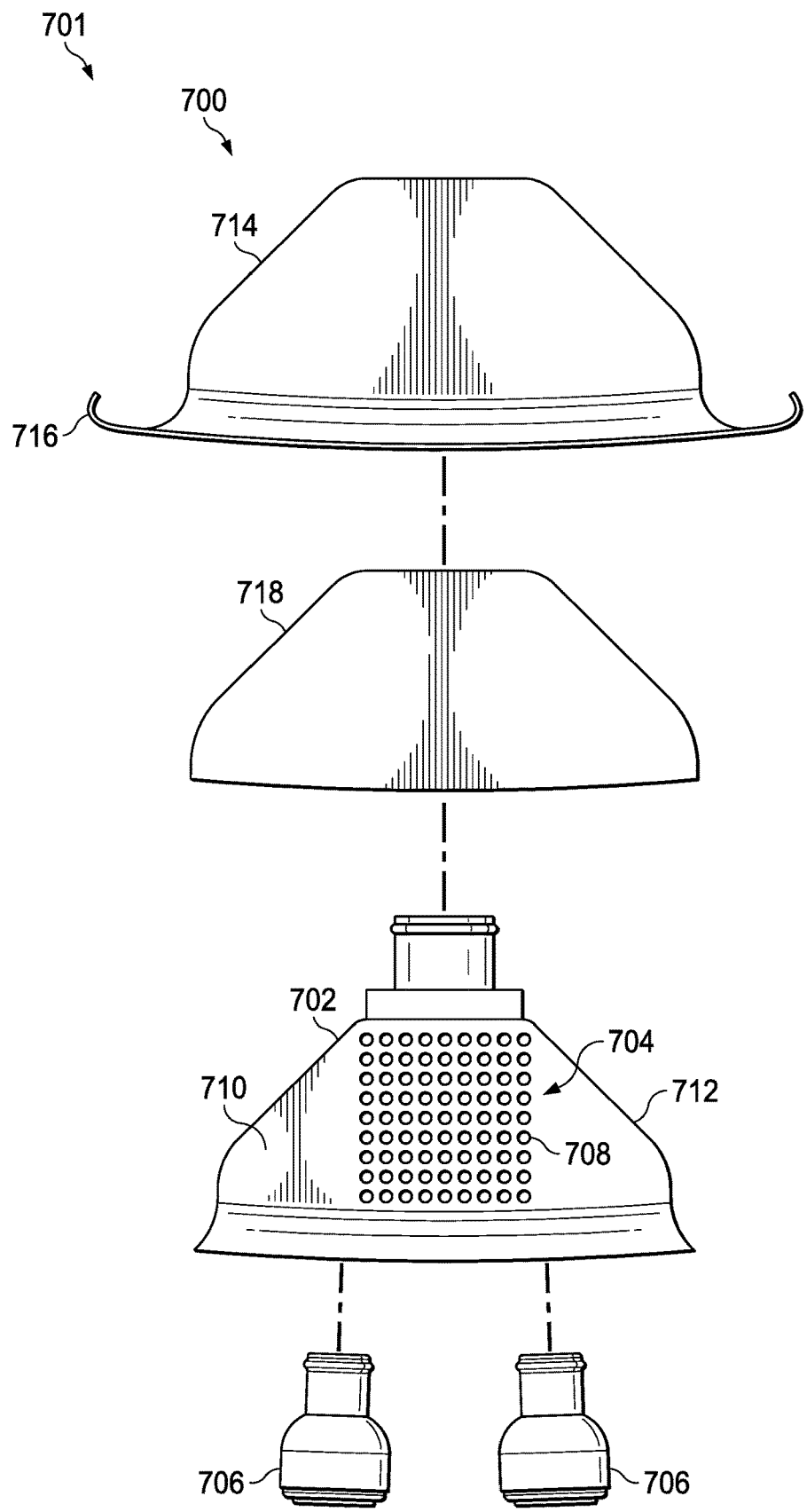
FIG. 7 is an illustration of an exploded side view of an aircraft air distribution assembly in accordance with an illustrative embodiment.

Turning now to FIG. 7, an illustration of an exploded side view of an aircraft air distribution assembly is depicted in accordance with an illustrative embodiment. Aircraft air distribution assembly 700 is a physical implementation of aircraft air distribution assembly 106 of FIG. 1. Aircraft air distribution assembly 700 may be installed within aircraft 200 of FIG. 2. In some illustrative examples, aircraft air distribution assembly 700 is a physical implementation of aircraft air distribution assembly 206 of FIGS. 2 and 3. In some illustrative examples, view 701 of aircraft air distribution assembly 700 is a side exploded view of at least one of aircraft air distribution assembly 400 of FIG. 4, aircraft air distribution assembly 500 of FIG. 5, or aircraft air distribution assembly 600 of FIG. 6.

Aircraft air distribution assembly 700 provides integrated personally controllable air flow and cabin air flow. Aircraft air distribution assembly 700 comprises plenum 702 and flow restriction system 704 extending through at least one wall of plenum 702. When assembled, plenum 702 is connected to plurality of personal air outlets 706 configured to provide the personally controllable air flow. Flow restriction system 704 is configured to set a pressure for the cabin air flow.

As depicted, flow restriction system 704 comprises plurality of flow restriction holes 708. Plurality of flow restriction holes 708 extends through wall 710 of plenum 702. Wall 710 of plenum 702 is a portion of exterior surface 712 of plenum 702.

When aircraft air distribution assembly 700 is assembled, a channel is formed between exterior surface 712 of plenum 702 and housing 714 of aircraft air distribution assembly 700. When aircraft air distribution assembly 700 is assembled, housing 714 surrounds exterior surface 712 of plenum 702.

Housing 714 forms nozzle 716 configured to direct air from the channel into a cabin to provide the cabin air flow. When aircraft air distribution assembly 700 is assembled, nozzle 716 encircles a passenger interaction panel of aircraft air distribution assembly 700. When aircraft air distribution assembly 700 is assembled, plurality of personal air outlets 706 extends through the passenger interaction panel.

As depicted, aircraft air distribution assembly 700 further comprises acoustic material 718. Acoustic material 718 is positioned within the channel between housing 714 and plenum 702. In some illustrative examples, acoustic material 718 is connected to housing 714 within the channel.

Figure 8:
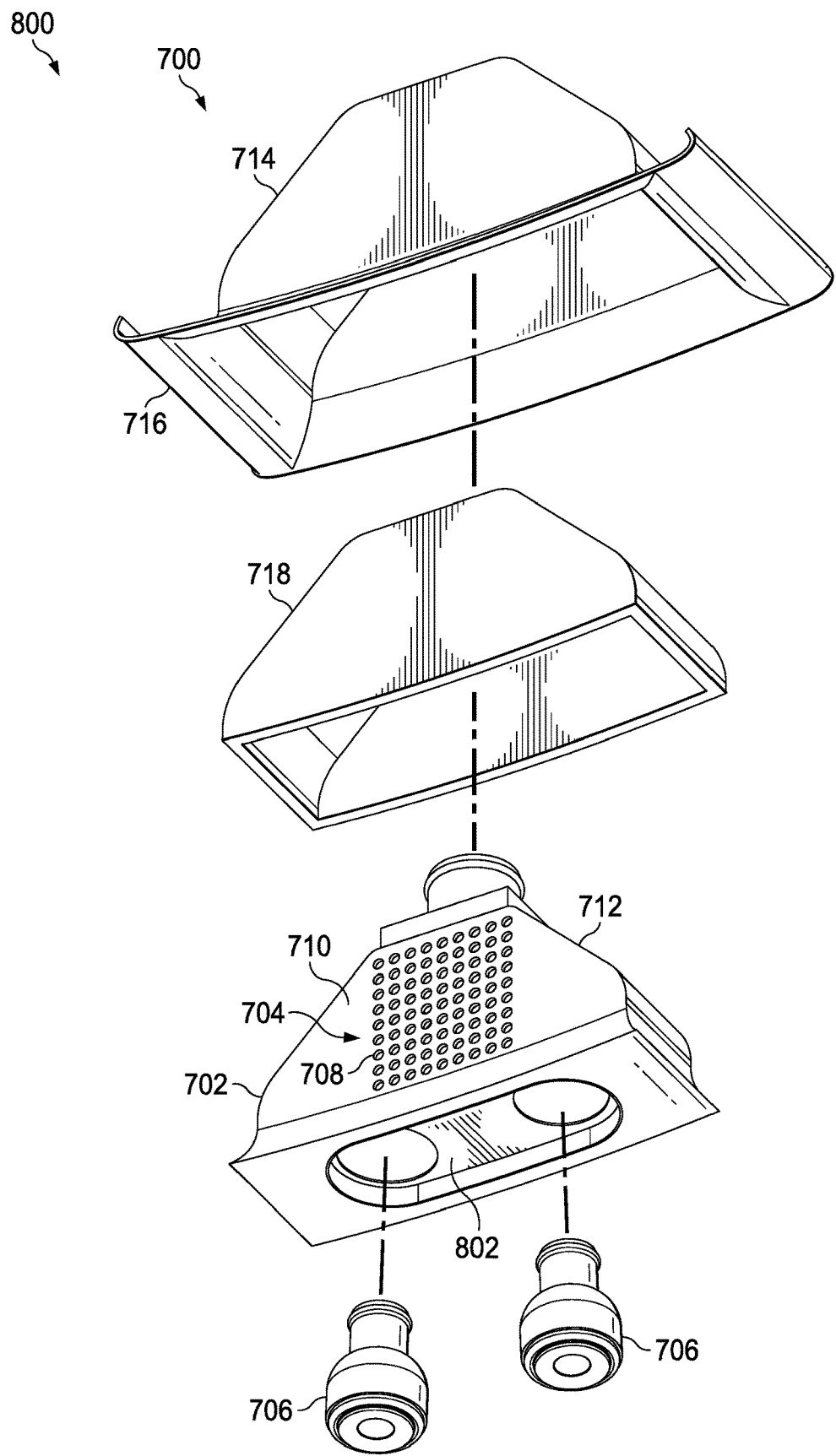
FIG. 8 is an illustration of an exploded perspective view of an aircraft air distribution assembly in accordance with an illustrative embodiment.

Turning now to FIG. 8, an illustration of an exploded perspective view of an aircraft air distribution assembly is depicted in accordance with an illustrative embodiment. View 800 is an exploded perspective view of aircraft air distribution assembly 700 of FIG. 7. In view 800, passenger interaction panel 802 of aircraft air distribution assembly 700 is visible. Passenger interaction panel 802 includes any desirable types of interactive components. In some non-depicted illustrative examples, passenger interaction panel 802 includes at least one of a call button, a light, or any other type of interactive component.

Figure 9:
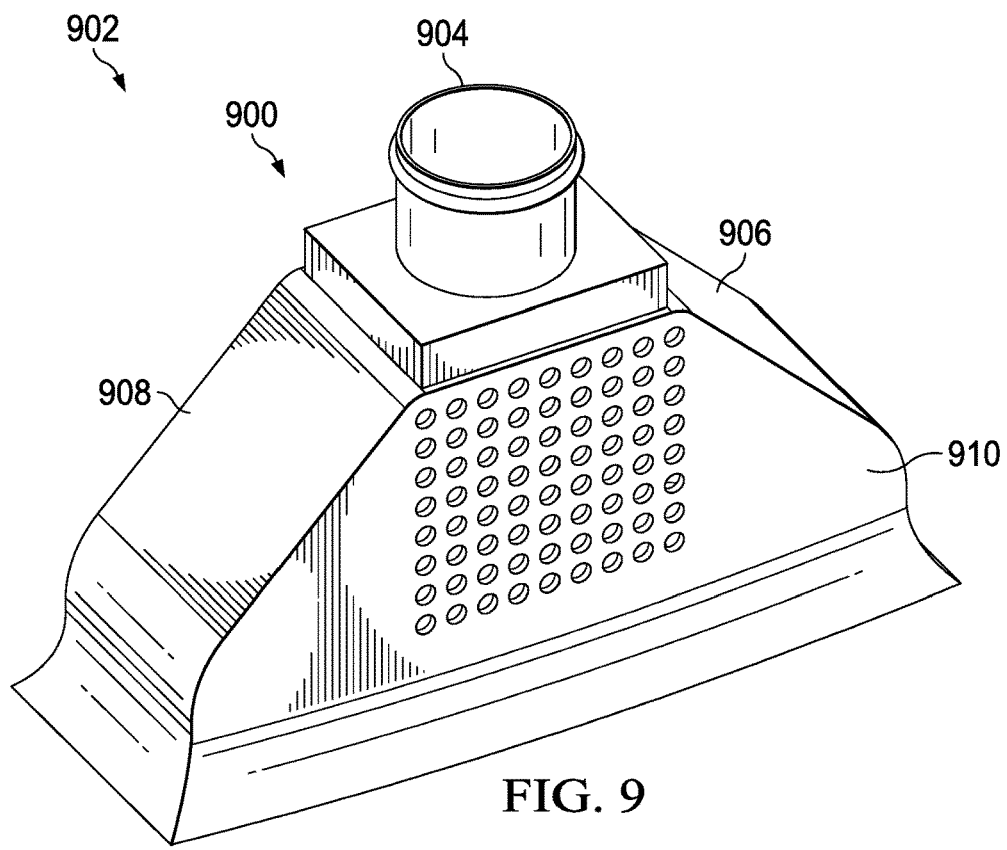
FIG. 9 is an illustration of a perspective view of a plenum of an aircraft air distribution assembly in accordance with an illustrative embodiment.

Turning now to FIG. 9, an illustration of a perspective view of a plenum of an aircraft air distribution assembly is depicted in accordance with an illustrative embodiment. Plenum 900 is a physical implementation of plenum 108 of FIG. 1. Plenum 900 may be implemented in any of aircraft air distribution assembly 206 of FIGS. 2 and 3, aircraft air distribution assembly 400 of FIG. 4, aircraft air distribution assembly 500 of FIG. 5, aircraft air distribution assembly 600 of FIG. 6, or aircraft air distribution assembly 700 of FIG. 7.

In view 902, air inlet 904 to plenum 900 is visible. Wall 906 and wall 908 of plenum 900 are also visible. In view 902, wall 906 and wall 908 do not have components of a flow restriction system. Plenum 900 has a flow restriction system present in a number of walls of plenum 900 that are not visible.

In other non-depicted examples, components of a flow restriction system are present in at least one of wall 906 or wall 908. In some illustrative examples, at least one of a plurality of flow restriction holes, a number of slots, or a pressure relief valve is present in at least one of wall 906 or wall 908.

Figure 10:
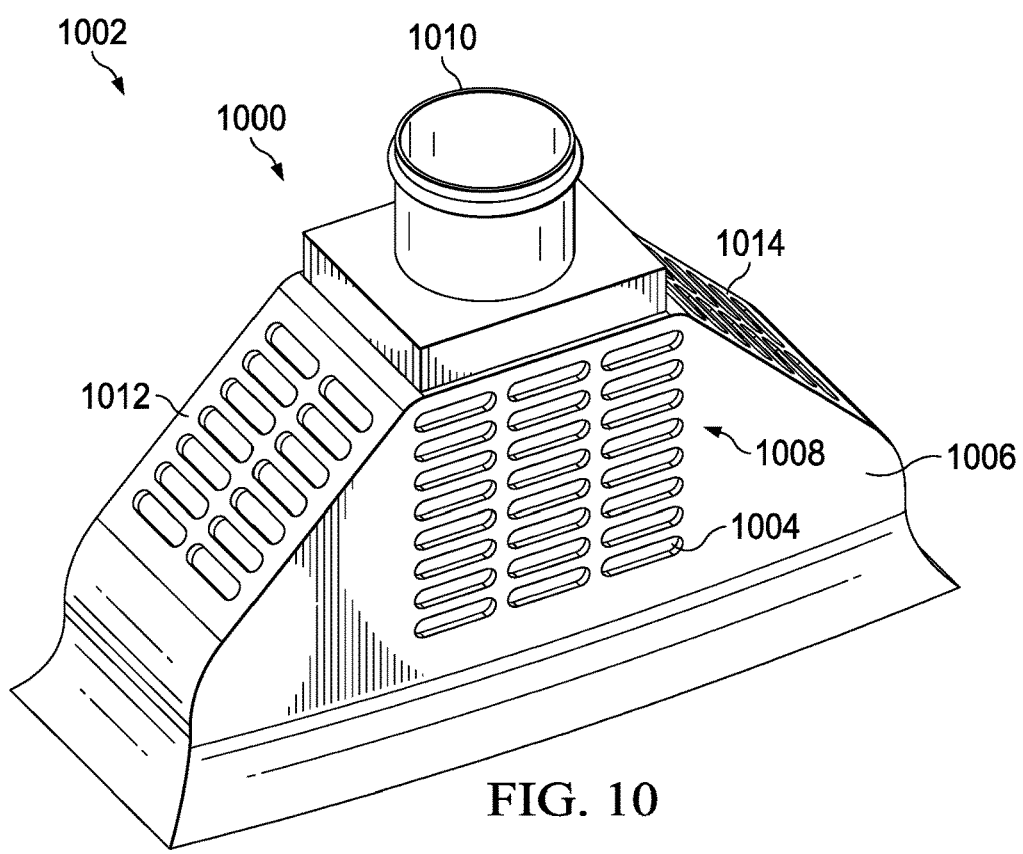
FIG. 10 is an illustration of a view of a plenum of an aircraft air distribution assembly in accordance with an illustrative embodiment.

Turning now to FIG. 10, an illustration of a view of a plenum of an aircraft air distribution assembly is depicted in accordance with an illustrative embodiment. Plenum 1000 may be implemented in any of aircraft air distribution assembly 206 of FIGS. 2 and 3, aircraft air distribution assembly 400 of FIG. 4, aircraft air distribution assembly 500 of FIG. 5, aircraft air distribution assembly 600 of FIG. 6, or aircraft air distribution assembly 700 of FIG. 7.

In view 1002, number of slots 1004 is present in wall 1006, wall 1012, and wall 1014 of plenum 1000. In this illustrative example, flow restriction system 1008 comprises number of slots 1004. In some illustrative examples, flow restriction system 1008 further comprises a number of slots through a wall parallel to wall 1006. For example, flow restriction system 1008 may further comprise a number of slots through a wall opposite wall 1006 relative to air inlet 1010. In these illustrative examples, each wall of plenum 1000 has flow restriction system 1008.

FIG. 10 is only one non-limiting example of plenum 1000. Number of slots 1004 is only one illustrative example of a quantity and size of slots. Number of slots 1004 may contain any desirable quantity of slots and size of slots. In other non-depicted examples, components of a flow restriction system different than number of slots 1004 are present in at least one of wall 1006, wall 1012, or wall 1014. In some illustrative examples, at least one of a plurality of flow restriction holes, or a pressure relief valve is present in at least one of wall 1006, wall 1012, or wall 1014. In other non-depicted examples, components of flow restriction system 1008 are not present in at least one of wall 1006, wall 1012, or wall 1014.

Figure 11:
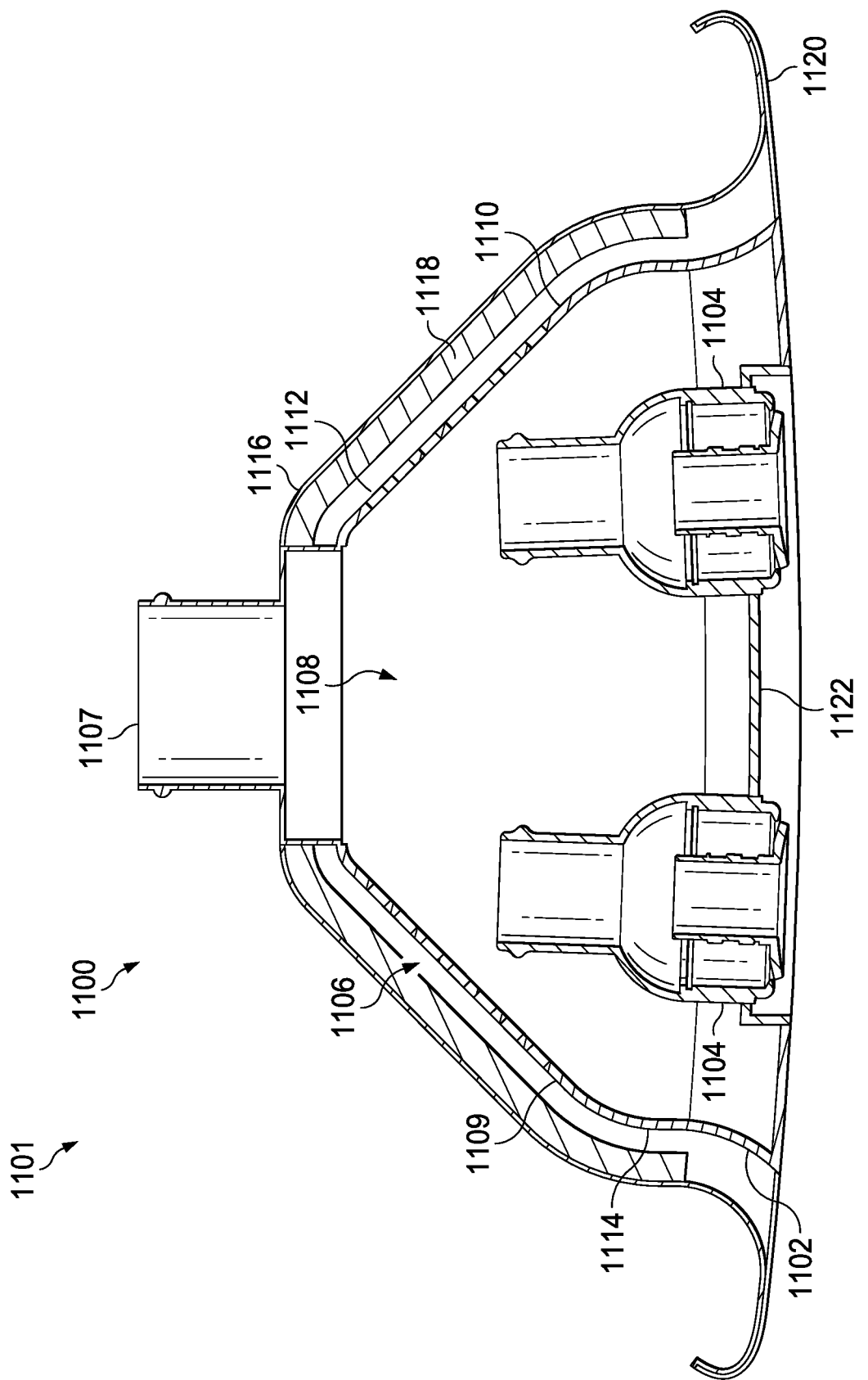
FIG. 11 is an illustration of a cross-sectional view of an aircraft air distribution assembly in accordance with an illustrative embodiment.

Turning now to FIG. 11, an illustration of a cross-sectional view of an aircraft air distribution assembly is depicted in accordance with an illustrative embodiment. Aircraft air distribution assembly 1100 is a physical implementation of aircraft air distribution assembly 106 of FIG. 1. Aircraft air distribution assembly 1100 may be installed within aircraft 200 of FIG. 2. In some illustrative examples, aircraft air distribution assembly 1100 is a physical implementation of aircraft air distribution assembly 206 of FIGS. 2 and 3. In some illustrative examples, view 1101 of aircraft air distribution assembly 1100 is a cross-sectional view of at least one of aircraft air distribution assembly 400 of FIG. 4, aircraft air distribution assembly 500 of FIG. 5, aircraft air distribution assembly 600 of FIG. 6, or aircraft air distribution assembly 700 of FIGS. 7 and 8.

Aircraft air distribution assembly 1100 is configured to provide integrated personally controllable air flow and cabin air flow. Aircraft air distribution assembly 1100 comprises plenum 1102 connected to plurality of personal air outlets 1104 configured to provide the personally controllable air flow, and flow restriction system 1106 extending through at least one wall of plenum 1102. Flow restriction system 1106 is configured to set a pressure for the cabin air flow.

Air is supplied to aircraft air distribution assembly 1100 at air inlet 1107 of aircraft air distribution assembly 1100. Air inlet 1107 is a component of plenum 1102. The air is supplied at a high pressure to aircraft air distribution assembly 1100. The air enters aircraft air distribution assembly 1100 at air inlet 1107 and enters chamber 1108 formed by plenum 1102.

As depicted, flow restriction system 1106 of aircraft air distribution assembly 1100 comprises at least one of plurality of flow restriction holes or a number of slots. At least one of plurality of flow restriction holes or a number of slots extend through wall 1109 and wall 1110 of plenum 1102.

Channel 1112 is formed between exterior surface 1114 of plenum 1102 and housing 1116 of aircraft air distribution assembly 1100. Housing 1116 surrounds exterior surface 1114 of plenum 1102. Acoustic material 1118 is positioned in channel 1112. In some illustrative examples, acoustic material 1118 is connected to housing 1116 within channel 1112.

In some illustrative examples, housing 1116 is at least one of fastened to plenum 1102, welded to plenum 1102, snapped onto plenum 1102, or bonded to plenum 1102. In some illustrative examples, housing 1116 is formed and integrated along with plenum 1102 by additive manufacturing. When housing 1116 and plenum 1102 are formed together through additive manufacturing, fastening, welding, snapping, or bonding is not used. Housing 1116 forms nozzle 1120 configured to direct air from channel 1112 into a cabin of an aircraft to provide the cabin air flow.

Nozzle 1120 encircles passenger interaction panel 1122 of aircraft air distribution assembly 1100. Plurality of personal air outlets 1104 extends through passenger interaction panel 1122.

Figure 12:
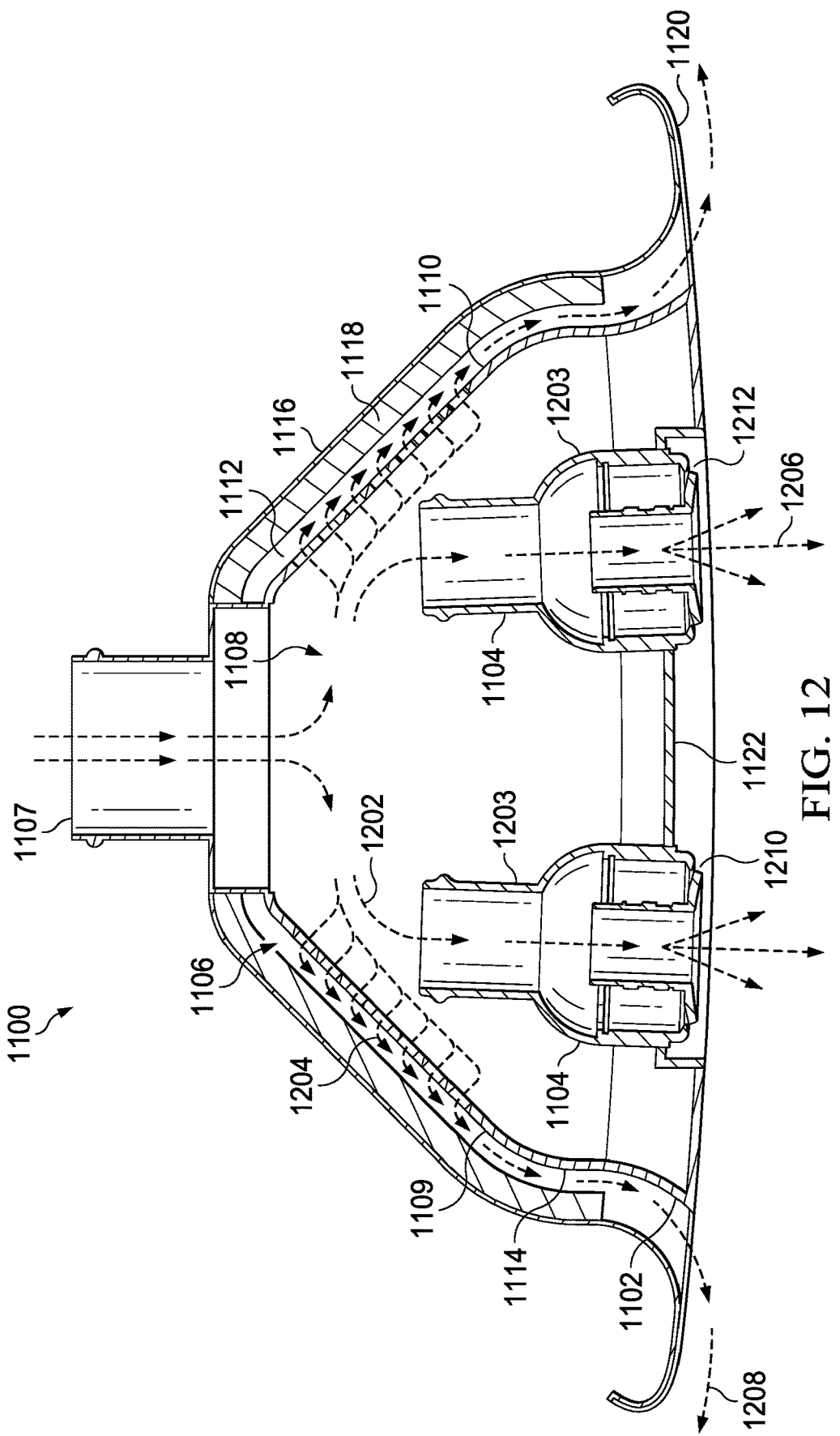
FIG. 12 is an illustration of a cross-sectional view of an aircraft air distribution assembly with air flow indicated in accordance with an illustrative embodiment.

Turning now to FIG. 12, an illustration of a cross-sectional view of an aircraft air distribution assembly with air flow indicated is depicted in accordance with an illustrative embodiment. View 1200 is a view of aircraft air distribution assembly 1100 of FIG. 11 with air flow indicated.

Aircraft air distribution assembly 1100 has first air path 1202 extending from air inlet 1107 into plenum 1102 and through plurality of personal air outlets 1104 connected to plenum 1102. Aircraft air distribution assembly 1100 has second air path 1204 extending from air inlet 1107 into plenum 1102, through flow restriction system 1106, and through channel 1112 formed by exterior surface 1114 of plenum 1102 and housing 1116 of aircraft air distribution assembly 1100.

Aircraft air distribution assembly 1100 provides integrated personally controllable air flow 1206 and cabin air flow 1208. Aircraft air distribution assembly 1100 comprises plenum 1102 connected to plurality of personal air outlets 1104 configured to provide personally controllable air flow 1206, and flow restriction system 1106 extending through wall 1109 and wall 1110 of plenum 1102. Flow restriction system 1106 is configured to set a pressure for cabin air flow 1208.

As depicted, air following first air path 1202 flows through set of personal air outlets 1203 of plurality of personal air outlets 1104 connected to plenum 1102. As depicted, set of personal air outlets 1203 includes personal air outlet 1210 and personal air outlet 1212. Personal air outlet 1210 and personal air outlet 1212 are both adjustable by a passenger.

In some illustrative examples, personal air outlet 1210 is adjusted by a passenger to close personal air outlet 1210. In these illustrative examples, set of personal air outlets 1203 includes personal air outlet 1212. In some illustrative examples, personal air outlet 1212 is adjusted by a passenger to close personal air outlet 1212. In these illustrative examples, set of personal air outlets 1203 includes personal air outlet 1210. In some illustrative examples, both personal air outlet 1210 and personal air outlet 1212 are adjusted by a number of passengers to close personal air outlet 1210 and personal air outlet 1212. In these illustrative examples, set of personal air outlets 1203 includes zero personal air outlets.

The different components shown in FIGS. 2-12 may be combined with components in FIG. 1, used with components in FIG. 1, or a combination of the two. Additionally, some of the components in FIGS. 2-12 may be illustrative examples of how components shown in block form in FIG. 1 can be implemented as physical structures.

Aircraft air distribution assembly 206 of FIGS. 2 and 3, aircraft air distribution assembly 400 of FIG. 4, aircraft air distribution assembly 500 of FIG. 5, aircraft air distribution assembly 600 of FIG. 6, or aircraft air distribution assembly 700 of FIGS. 7 and 8, plenum 900 of FIG. 9, plenum 1000 of FIG. 10, and aircraft air distribution assembly 1100 of FIG. 11 are not meant to imply physical or architectural limitations to the manner in which an illustrative embodiment may be implemented. Other components in addition to or in place of the ones illustrated may be used. Some components may be unnecessary. For example, any desirable quantity of personal air outlets is present in an aircraft air distribution assembly. As another example, any desirable shape of housing is present in an aircraft air distribution assembly. As yet another example, a plenum of an aircraft air distribution assembly has any desirable size or shape.

Figure 13:
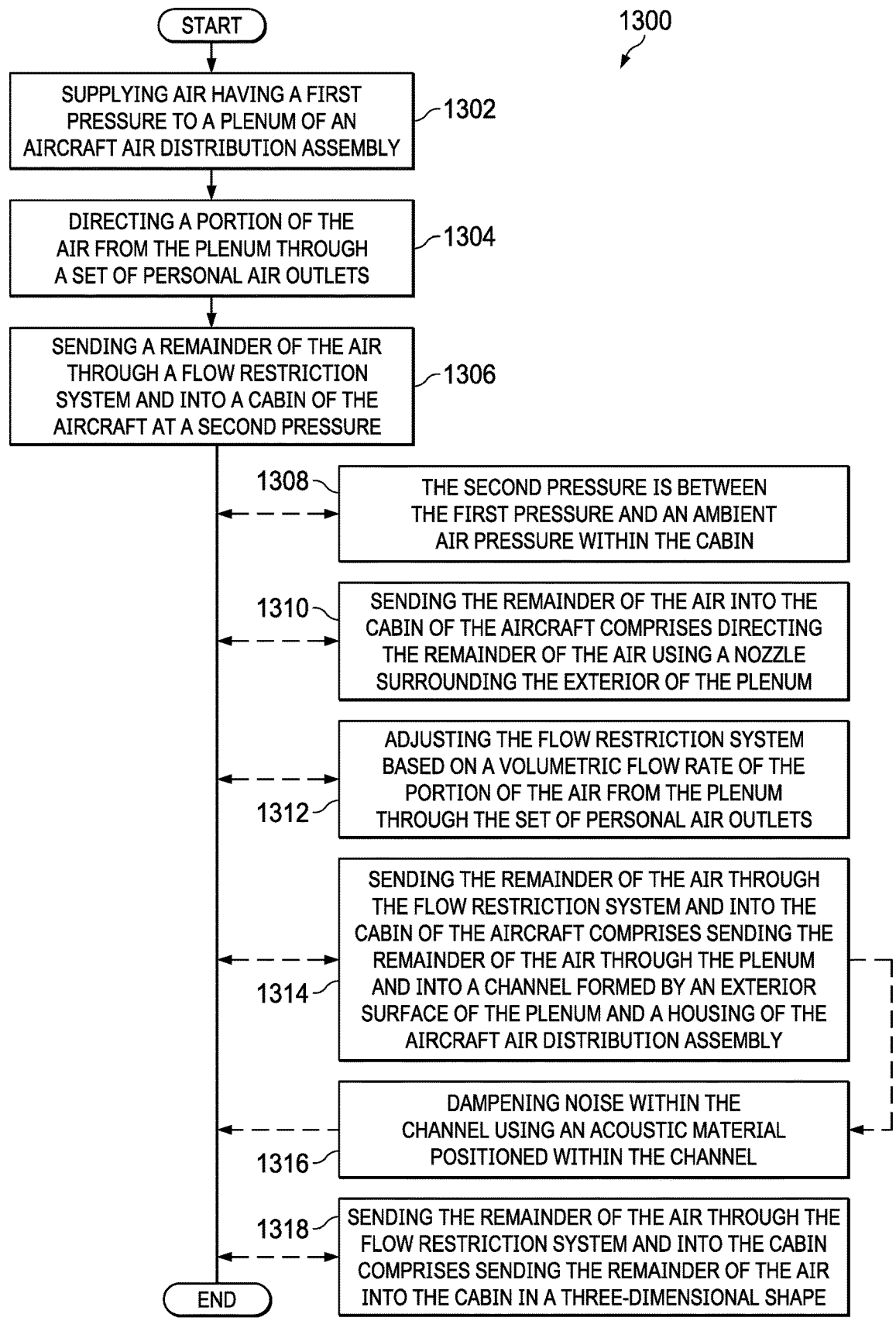
FIG. 13 is an illustration of a flowchart of a method for distributing air using an aircraft air distribution assembly in accordance with an illustrative embodiment.

Turning now to FIG. 13, an illustration of a flowchart of a method for distributing air using an aircraft air distribution assembly is depicted in accordance with an illustrative embodiment. Method 1300 may be implemented within aircraft 100 of FIG. 1 or aircraft 200 of FIG. 2. Method 1300 may be implemented using any of aircraft air distribution assembly 206 of FIGS. 2 and 3, aircraft air distribution assembly 400 of FIG. 4, aircraft air distribution assembly 500 of FIG. 5, aircraft air distribution assembly 600 of FIG. 6, aircraft air distribution assembly 700 of FIGS. 7 and 8, or aircraft air distribution assembly 1100 of FIGS. 11 and 12.

Method 1300 supplies air having a first pressure to a plenum of an aircraft air distribution assembly (operation 1302). Method 1300 directs a portion of the air from the plenum through a set of personal air outlets (operation 1304). Method 1300 sends a remainder of the air through a flow restriction system and into a cabin of the aircraft at a second pressure (operation 1306). Afterwards, method 1300 terminates.

In some illustrative examples, the second pressure is between the first pressure and an ambient air pressure within the cabin (operation 1308). In some illustrative examples, sending the remainder of the air into the cabin of the aircraft comprises directing the remainder of the air using a nozzle surrounding an exterior of the plenum (operation 1310).

In some illustrative examples, method 1300 further comprises adjusting the flow restriction system based on a volumetric flow rate of the portion of the air from the plenum through the set of personal air outlets (operation 1312). In some illustrative examples, adjusting the flow restriction system comprises utilizing a pressure relief valve.

In some illustrative examples, sending the remainder of the air through the flow restriction system and into the cabin of the aircraft comprises sending the remainder of the air through the plenum and into a channel formed by an exterior surface of the plenum and a housing of the aircraft air distribution assembly (operation 1314).

In some illustrative examples, method 1300 dampens noise within the channel using an acoustic material positioned within the channel (operation 1316). In some illustrative examples, the acoustic material is adhered to the housing of the aircraft air distribution assembly.

In some illustrative examples, sending the remainder of the air through the flow restriction system and into the cabin comprises sending the remainder of the air into the cabin in a three-dimensional shape (operation 1318).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1300 are performed. For example, operations 1308 through 1318 of FIG. 13 are optional.

Figure 14:
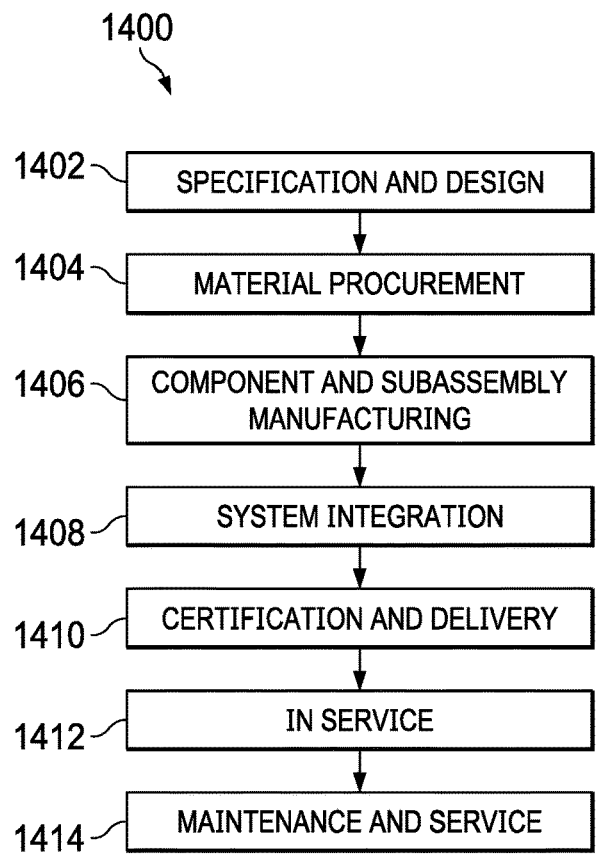
FIG. 14 is an illustration of an aircraft manufacturing and service method in a form of a block diagram in accordance with an illustrative embodiment.
Figure 15:
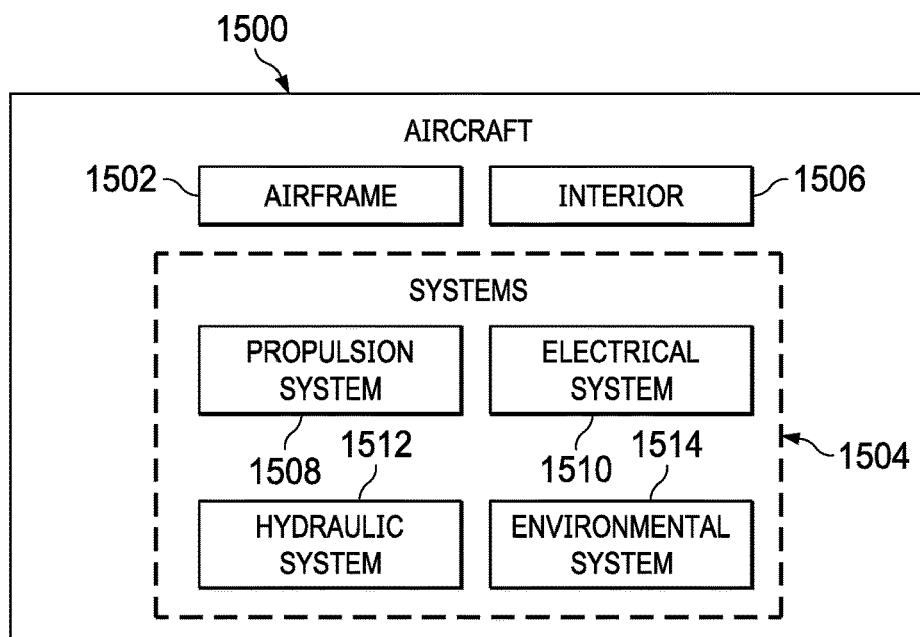
FIG. 15 is an illustration of an aircraft in a form of a block diagram in which an illustrative embodiment may be implemented.

The illustrative examples of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative example. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 15, an illustration of an aircraft is depicted in which an illustrative example may be implemented. In this example, aircraft 1500 is produced by aircraft manufacturing and service method 1400 in FIG. 14 and may include airframe 1502 with a plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1400. One or more illustrative examples may be used during component and subassembly manufacturing 1406, system integration 1408, or maintenance and service 1414 of FIG. 14. For example, aircraft air distribution assembly 106 may be installed within aircraft 1500, during component and subassembly manufacturing 1406. As another example, aircraft air distribution assembly 106 may be a replacement part used to replace a pre-existing aircraft air distribution assembly during maintenance and service 1414 of FIG. 14.

The illustrative examples integrate passenger cabin air distribution nozzles into a shared overhead passenger service unit (PSU) module, known as an aircraft air distribution assembly, along with passenger personal air outlets (PAO/gaspers). By combining air nozzles and personal air outlets into a single aircraft air distribution assembly, air supply tubing within an aircraft is reduced. By combining air nozzles and personal air outlets into a single aircraft air distribution assembly, air flow within a cabin of an aircraft is more easily controlled. For example, by combining the aircraft air distribution assembly with a process of tailoring a total airflow into the airplane based on a passenger quantity, the quantity and location of cabin nozzles and the associated air distribution flow is customized based upon number of passengers to optimize fuel burn, aircraft weight, aircraft manufacturing cost, and aircraft operating costs.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft air distribution assembly, comprising:
a plenum, forming a chamber;
a plurality of personal air outlets, configured to provide personally controllable air flow and connected to the plenum such that air exits the chamber via the plurality of personal air outlets;
a flow restrictor, extending through at least one wall of the plenum, wherein the flow restrictor is configured to provide cabin air flow and to set a pressure for the cabin air flow;
a housing that surrounds an exterior surface of the plenum; and
a channel, formed between the exterior surface of the plenum and the housing, wherein the housing forms a nozzle, configured to direct air from the channel into a cabin to provide the cabin air flow such that the cabin air flow exits the channel around at least a portion of a passenger interaction panel of the aircraft air distribution assembly, and wherein the plurality of personal air outlets extends through the passenger interaction panel.

2. The aircraft air distribution assembly of claim 1, wherein the flow restrictor comprises a plurality of flow restriction holes.

3. The aircraft air distribution assembly of claim 1, wherein the flow restrictor comprises a pressure relief valve.

4. The aircraft air distribution assembly of claim 1, further comprising an acoustic material connected to the housing within the channel.

5. The aircraft air distribution assembly of claim 1, wherein the housing is at least one of fastened to the plenum, welded to the plenum, snapped onto the plenum, or bonded to the plenum.

6. The aircraft air distribution assembly of claim 1, wherein:
the nozzle encircles the passenger interaction panel of the aircraft air distribution assembly.

7. An aircraft, comprising:
a cabin;
a plurality of rows of passenger seats within the cabin; and
a plurality of aircraft air distribution assemblies, positioned above the plurality of rows of passenger seats, each of the plurality of aircraft air distribution assemblies comprising:
a plenum, forming a chamber;
a plurality of personal air outlets, configured to provide personally controllable air flow and connected to the plenum such that air exits the chamber via the plurality of personal air outlets;
a flow restrictor, extending through at least one wall of the plenum, wherein the flow restrictor is configured to provide cabin air flow and to set a pressure for the cabin air flow;
a passenger interaction panel;
a housing that surrounds an exterior surface of the plenum; and
a channel, formed between the housing and the exterior surface of the plenum, wherein the housing forms a nozzle, configured to direct air from the channel into the cabin to provide the cabin air flow such that the cabin air flow exits the channel around at least a portion of the passenger interaction panel, and wherein the plurality of personal air outlets extends through the passenger interaction panel.

8. The aircraft of claim 7, wherein each of the plurality of aircraft air distribution assemblies is positioned above a respective row of passenger seats of the plurality of rows of passenger seats.

9. The aircraft of claim 7, wherein each of the plurality of aircraft air distribution assemblies further comprises:
an air inlet to the plenum,
a first air path that extends from the air inlet into the plenum and through the plurality of personal air outlets, and
a second air path that extends from the air inlet into the plenum, through the flow restrictor, and through the channel.

10. The aircraft of claim 9, wherein the flow restrictor comprises at least one of a plurality of flow restriction holes, a number of slots, or a pressure relief valve.

11. The aircraft of claim 9, wherein
the nozzle encircles the passenger interaction panel of a corresponding one of the plurality of aircraft air distribution assemblies.

12. A method of distributing air using an aircraft air distribution assembly, the method comprising steps of:
supplying the air, having a first pressure, to a plenum of the aircraft air distribution assembly, wherein the plenum forms a chamber;
directing a portion of the air from the plenum to exit the chamber through a set of personal air outlets; and
sending a remainder of the air through a flow restrictor and into a cabin of an aircraft at a second pressure, wherein the step of sending the remainder of the air through the flow restrictor and into the cabin of the aircraft comprises sending the remainder of the air through the plenum and into a channel, formed by an exterior surface of the plenum and by a housing of the aircraft air distribution assembly, wherein the step of sending the remainder of the air through the flow restrictor and into the cabin of the aircraft further comprises directing the remainder of the air using a nozzle, formed by the housing and configured such that the remainder of the air exits the channel around at least a portion of a passenger interaction panel of the aircraft air distribution assembly, and wherein the set of personal air outlets extends through the passenger interaction panel.

13. The method of claim 12, wherein the second pressure is between the first pressure and an ambient air pressure within the cabin.

14. The method of claim 12, wherein:
the nozzle surrounds an exterior of the plenum, and
the nozzle encircles the passenger interaction panel of the aircraft air distribution assembly.

15. The method of claim 12, further comprising adjusting the flow restrictor based on a volumetric flow rate of the portion of the air from the plenum through the set of personal air outlets.

16. The method of claim 12, wherein the step of sending the remainder of the air through the flow restrictor and into the cabin of the aircraft comprises sending the remainder of the air through the plenum and into the channel, formed by the exterior surface of the plenum and by the housing of the aircraft air distribution assembly.

17. The method of claim 16 further comprising dampening noise within the channel using an acoustic material, positioned within the channel.

18. The method of claim 12, wherein the step of sending the remainder of the air through the flow restrictor and into the cabin comprises sending the remainder of the air into the cabin in a three-dimensional shape.

* * * * *